United States Patent [19]
Yarmashev et al.

[11] Patent Number: 4,919,641
[45] Date of Patent: Apr. 24, 1990

[54] AXIAL THRESHING AND SEPARATING MEANS

[75] Inventors: Jury N. Yarmashev; Vladimir A. Zapandi; Valentin N. Tkachev; Olev I. Peder, all of Taganrog, U.S.S.R.

[73] Assignee: Spetsializirovannoe Konstruktorskoe Bjuro No Komplexam Machin Dlya Dvukhafaznoi Uborki, Taganrog, U.S.S.R.

[21] Appl. No.: 255,108

[22] Filed: Oct. 7, 1988

[51] Int. Cl.⁵ .............................................. A01F 12/20
[52] U.S. Cl. ........................................ 460/69; 460/70
[58] Field of Search ................. 130/27 T, 27 R, 27 H, 130/27 HA, 27 J, 27 Q; 56/14.6; 460/59, 66, 68, 69, 70, 75, 77

[56] References Cited
U.S. PATENT DOCUMENTS

| | | | |
|---|---|---|---|
| 3,982,548 | 9/1976 | Stamp et al. | 130/27 HA |
| 4,148,323 | 4/1979 | McMillen et al. | 130/27 T |
| 4,164,947 | 8/1979 | Wilson | 130/27 T |
| 4,178,943 | 12/1979 | West | 56/14.6 |
| 4,535,787 | 8/1985 | Underwood | 130/27 R |

*Primary Examiner*—Stephen J. Novosad
*Assistant Examiner*—Terry Lee Melius
*Attorney, Agent, or Firm*—Burgess, Ryan and Wayne

[57] ABSTRACT

A characteristic feature of the present invention is that in an axial means having a housing internally rotatably mounting a rotor on the surface of which threshing and separating elements are arranged in steps. Each step comprises conjugated helical and straight portions. Between the threshing and separating elements conveying elements are disposed so that each of them is connnected by its forward (with respect to the direction of rotation of the rotor) end to the preceding straight portion, its rearward end being positioned with a gap relative to the following straight portion.

5 Claims, 2 Drawing Sheets

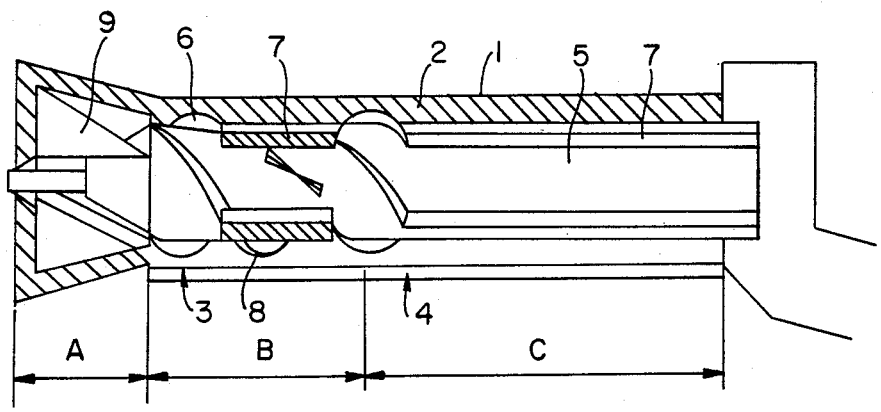
F I G. 1

AXIAL THRESHING AND SEPARATING MEANS

FIELD OF THE INVENTION

The present invention relates to the agricultural machinery industry, and more particularly to threshing and separating means used in axial flow grain combines.

The present invention may be used most effectively in harvesting long-stalked, damp cereal crops such as wheat and rye, and seed-bearing plants of grasses such as clover and lucerne etc.

BACKGROUND OF THE INVENTION

In the known threshing and separating means of an axial flow combine, comprising an axially extending rotor coacting with a housing having helical ribs mounted on the internal surface thereof, which surrounds it from above, and with a concave and separating grate, which embrace the rotor from below, and defining therewith a narrow annular space, the following processes take place simultaneously; threshing of oncoming crop material, separation of grain therefrom and propelling of the material axially over a spiral path towards an outlet from the combine. In such a means provided with threshing and separating bars axially arranged on the rotor, the most efficient are the functions of threshing and separating which makes it possible to carry out quality threshing and separation of grain from crop material with minimum losses of grain behind the combine.

However, along with such advantages the known threshing and separating means features a serious disadvantage residing in an inconsistently running process and a low capacity limited by unstable action of the given separating and threshing means on the crop material when processing long-stalked damp straw, especially in the threshing zone. Such a disadvantage depends on that the amount of material supplied to a forward end of the narrow annular space of the threshing zone is limited by this space. The threshing bars arranged on the rotor and axially extending from the forward end of the threshing zone, interacting with passive helical ribs rigidly attached to the housing fail to produce the necessary speed of crop material movement rearwards along the housing at the moment of entering thereof into the annular space, which results in an uneven distribution of the crop material in the annular space adversely affecting the efficiency of the threshing and separating process, which may cause clogging up of the inlet to the annular space of the threshing zone in case of overloading of the threshing and separating means. This brings about a considerable increase in the power consumed, a decrease in efficiency of the threshing function, an increase in grain losses behind the combine. Such disadvantage depends on the design of the rotor having threshing-separating and conveying elements the construction of which brings about unreliable running of the process, possibility of wisp formation, increased losses of grain behind the combine, clogging up of the threshing and separating means and a decreased overall capacity.

There are known some technical solutions in which threshing and separating elements are so made that together with the functions of threshing and separation they also fulfil a function of conveying crop material along the rotor axis rearwards to the outlet.

However, in an attempt to combine the functions of threshing or separating and the function of conveying in one element of the rotor at the expense of changing the shape of the threshing or separating elements to actively act upon the conveying of crop material one or even both of functions become less efficient as the physical characteristics of the rotor elements required to perform each of the functions are different.

Special difficulties arise in processing long-stalked and damp cereal crops, particularly in the threshing zone when the crop material being threshed tends to wind round the rotor, i.e. wisp formation occurs, which results in increased losses of grain behind the combine, and tendency to wisp formation makes the rotor much less stable to uneven feed of crop material from the header or gatherer and results in an excessive power consumption.

One of the conditions increasing the reliability of the process running in the axial threshing and separating means is to maintain an acceptable level of a specific throughput of crop material threshed by the rotor.

To increase a rearward flow of crop material and to set an optimum amount of the threshed and separated crop material, the rotor body is provided with a series of elements, i.e. specially designed bars being most suitably arranged thereon over helical lines perpendicular to the helical line of the housing guide ribs. Interaction of such bars and guide ribs of the housing intensities the rearward movement and agitation of the material thus improving the process of threshing and separation.

Known in the art is an axial flow combine in which to increase a rearward flow of crop material and to set an optimum amount thereof fed for threshing, a threshing and separating means comprises a rotor provided with a series of helical corrugated solid bars in the threshing zone.

However, with the functions of threshing and conveying of material combined in one element of the rotor the efficiency of one or both functions become worse, as the physical characteristics of the rotor elements required for fulfilling each of the functions differ and tendency to wisp formation makes the rotor less stable to uneven infeed and results in an excessive power consumption. Moreover, a helical arrangement of corrugated threshing bars on the rotor requires complicated methods of manufacturing the bars and the rotor as a whole to be employed.

There is known another axial flow combine wherein a threshing and separating means comprises a rotor having spiral correguated bars in the threshing zone and smooth bars in the separating zone.

Arranging the bars on the rotor at the section between the threshing and separating zones with a larger lead of helix compared with the other sections of the rotor minimizes clogging up of the rotor with stalk material in that zone when harvesting long-stalked crops, decreases grain losses behind the combine. However, the combination of the functions of threshing, separation and conveying of crop material in one element of the rotor worsens the efficiency of one or both functions, and tendency to wisp formation makes the rotor less stable to uneven feed of the material and results in an excessive power consumption.

Moreover, helical arrangement on the rotor of corrugated threshing bars asks for complicated methods of manufacturing the bars and the rotor as a whole to be used.

Also known in the art is an axial flow combine (cf. US, A, 4,164,947) wherein a threshing and separating means (a separator) comprises a housing having guide ribs on the internal surface thereof, a threshing concave and a separating grate, and a rotor mounted for rotation in the housing. The rotor is essentially a hollow cylinder mounting circumferentially threshing and separating elements between which material conveying elements are arranged at an angle to an axis of the rotor and spaced apart relative to each other along the length of the rotor.

In this prior art threshing and separating means of an axial flow combine the axially arranged rotor simultaneously performs threshing of oncoming crop material, separation of grain therefrom and conveying of the material over a spiral path to an outlet from the combine. Threshing, separation and conveying of the material are performed through an action of the cooperating elements of the rotor, concave, separating grate and the housing on the material being threshed.

In such a means having the threshing and separating elements arranged axially on the rotor and the conveying elements mounted therebetween, the primary objective of which conveying elements is to propel the material axially and also to agitate it as the rotor rotates, the functions of threshing and separation are the most effective ones.

A disadvantage of this prior art threshing and separating means is that a great power is consumed to carrying out the process and the rotor has tendency to clogging up. This is associated with the rotor design and mutual arrangement on the rotor surface of the processing elements having unstable characteristics of action upon the material in the course of processing long-stalked damp straw, especially in the threshing zone. This disadvantage is explained by that the amount of material fed to the forward end of the narrow annular space is great and the threshing elements axially extending on the rotor from the forward end of the threshing zone in cooperation with passive helical ribs rigidly fixed on the housing do not produce the required speed of rearward movement of the material at the moment of its entry into the annular space along the housing where an uneven distribution of the material may occur, which adversely affects the efficiency of the threshing and separating process due to which in case of the threshing and separating means being overloaded it may be clogged up by the material at the inlet into the annular space of the threshing zone and fail to operate. The conveying elements on the rotor make up closed zones in which processed material may build up and compact, in which case they fail to perform the function of conveying axially the material as the rotor rotates. As a result, power consumed for the process rises considerably, the effectiveness of threshing and separating functions lowers, losses of grain behind the combine increase.

Thus, the constructions of threshing and separating means described above feature a poor performance when processing long-stalked damp straw. The normal process of threshing and separation is disturbed which results in wisp formation, unreasonable grain losses behind the combine, excessive consumption of power and a descreased overall capacity of the combine.

SUMMARY OF THE INVENTION

The principal object of the invention is to provide an axial threshing and separating means possessing a greater degree of the process reliability at the expense of optimizing processes of threshing, separation and conveying of crop material.

Another object of the invention is to improve the design of processing elements of a rotor.

One more object of the invention is to decrease power consumed for driving the rotor.

Still another object of the invention is to reduce possibility of wisp formation and grain losses.

And yet another object of the invention is to increase the overall capacity of the means.

These and other objects are accomplished by that in an axial threshing and separating means of a grain combine having receiving, threshing and separating zones and comprising a housing with helical guide ribs on its internal surface, a threshing concave and a separating grate in its lower part, a rotor mounted for rotation in the housing and provided with threshing and separating elements and also with conveying elements arranged between the threshing and separating elements at an angle to a rotor axis and spaced apart relative to each other along the length of the rotor, according to the invention the threshing and separating elements are arranged in steps, each step being made in the form of contiguous and straight portions, and each conveying element is connected by its forward with respect to the direction of rotor rotation end to the preceding straight portion, its rearward end being positioned with a gap relative to the following straight portion.

The rotor of herein disclosed design with the threshing and separating elements arranged in steps in cooperation with rigidly secured helical guide ribs of the housing intensifies the rearward movement of the material loosening it in the course of movement and promoting the processes of threshing and separation. The conveying elements each of which is connected by its forward with respect to the direction of rotor rotation end to the preceding straight portion, its rearward end being positioned with a gap relative to the following straight portion, contribute to reducing a peripheral frictional force created on the rotor by the material in the annular space between the rotor and housing in the course of its movement under the action of the straight portions of the rotor steps, thus improving threshing, separation and conveying of the material, reducing the specific power consumption for driving. The processes of threshing, separation and conveying of crop material become more intensive which contributes to an increase in capacity of the threshing and separating means.

According to another embodiment of the invention one of the rotor steps has a helical portion disposed partly in the threshing zone and partly in the separating zone.

Such an arrangement of the helical portion on the rotor at the joint between the threshing and separating zones decreases clogging up of the helical portion with stalk material as the axial speed of material movement at this portion is greater than at the preceding and following portions which makes it possible to stretch out and loosen the material and thus to reduce the possibility of wisp formation and grain losses.

To avoid gaps between the ends of threshing and separating elements, they are made adjoining each other in the steps and between them.

In a preferred embodiment of the invention the helical portion of the rotor step starting from the forward end of the threshing zone has a section of variable height which increases in the direction of material axially movement, which provides a wider inlet free cross-sectional area to pass the material, increases throughput capacity of the threshing and separating means, whereas an outer edge of that helical portion made in the form of a wavy curve intensifies the effect of agitating the material and separating the grain through the concave at the beginning of the threshing zone, grain damage is reduced, probability of grain escape together with the straw into the separating zone lowers down and grain losses are minimized.

BRIEF DESCRIPTION OF THE DRAWINGS

Other objects and advantages of the present invention will become more apparent after referring to the following specification and attached drawings in which:

FIG. 1 is a longitudinal sectional view of an axial threshing and separating means of a grain combine;

DETAILED DESCRIPTION OF THE INVENTION

Figure 2:
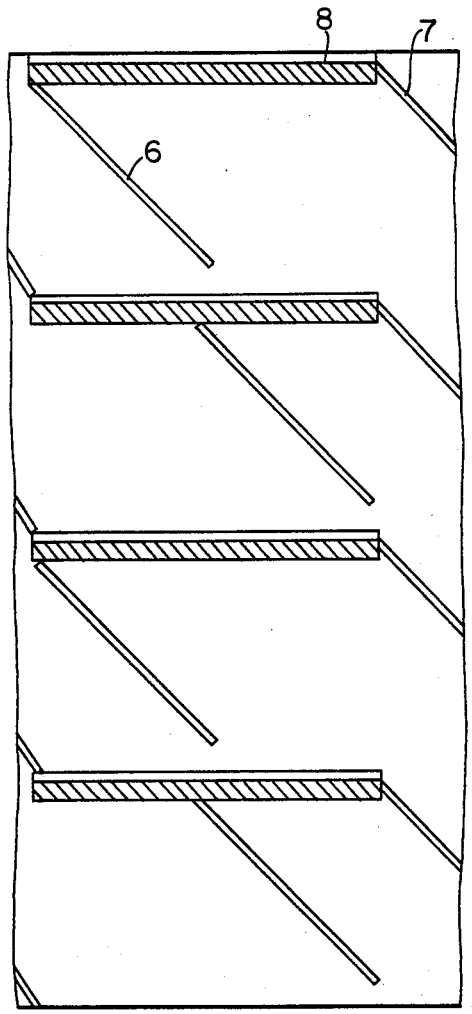
FIG. 2 is a developed view of conveying elements on a rotor.

FIG. 1 shows an axial threshing and separating means of a grain combine according to the invention, having a receiving zone A, a threshing zone B and a separating zone C and comprising a housing 1 with helical guide ribs 2 on its internal surface, a threshing concave 3 and a separating grate 4 in its lower part in the threshing B and separating C zones, a rotor 5 mounted for rotation in the housing 1 and provided with threshing and separating elements having each a helical portion 6 and straight portion 7, as well as conveying elements 8 (FIG. 2) arranged between them at an angle to an axis of the rotor 5 and spaced apart relative to each other along the length of the rotor. In the receiving zone A of the threshing and separating means on the rotor 5 there is mounted any known device 9 (FIG. 1) for receiving crop material fed from a header inclined chamber (not shown) and for delivering it to the threshing zone B.

The helical portions 6 and straight portions 7 of the threshing and separating elements form steps arranged on the rotor 5. The helical portion 6 of one of the steps is disposed partly in the threshing zone and partly in the separating zone. The helical portions 6 and straight portion 7 of the rotor 5 in the steps and between them adjoin each other. Each conveying element 8 (FIGS. 1,2) is connected by its forward end with the preceding straight portion 7, whereas its rearward end is positioned with a gap relative to the following straight portion 7 to pass the crop material. The conveying elements 8 are mounted on the rotor 5 so as to overlap the conjugated zones of their mounting. The helical portions 6 of the rotor 5 from a forward end of the concave 3 of the threshing zone have a section varying in height which increases in the direction of axial movement of the material, an outer edge of the helical portions being made in the form of a wavy curve. It should be noted that the outer edge of the helical portions may be smooth when it is not necessary to intensify the separating function of the means.

The axial threshing and separating means of the grain combine operates in the following way.

Crop material to be threshed fed from the header inclined chamber into the receiving zone of the means encounters impact and rubbing action of the working elements of the device 9. On being acted upon by the working elements the crop material is intensively spread in a thin layer over periphery of the receiving zone to be carried away over a helical line to the threshing zone. The threshing and separating processes take place as the material moves towards a discharge opening of the threshing and separating means.

The processing members of the rotor 5 take a portion of the material and impart to it a helical motion along the rotor axis. The helical portions 6 in each step in cooperation with the rigidly fixed helical guide ribs 2 of the housing 1, as well as the conveying elements 8 in the like cooperation, actively propel the material rearwards and fluff it up in the course of movement, thus intensifying the processes of threshing, separating and conveying of the material. The straight portions 7 interact with the guide ribs 2 of the housing 1 to further propel the material rearwards and to distribute it for more effective threshing and separating thereof. The conveying elements 8 contribute to reducing the peripheral frictional force created on the rotor by the material in the annular space between the rotor 5 and the housing 1, and when installed on the rotor with forming a free space to pass the material they optimize the functions of threshing, separating and conveying of the material. The wavy outer edge of the helical portions 6 at the beginning of the threshing zone intensifies the effect of material agitation and grain separation through the concave 3 at the beginning of said threshing zone, grain damage is reduced, probability of grain escape together with the straw into the separating zone lowers down and losses of grain behind the combine are minimized; the helical portions beginning from the forward end of the threshing zone made with varying height, which rises in the direction of material axial movement, provide a wider inlet free cross-sectional area of the annular space to pass the material which increases throughput capacity of the threshing and separating means.

The reliable running of the process at the expense of optimizing the processes of threshing, separation and conveying of the material, and reducing the possibility of wisp formation makes it possible to reduce losses of grain, decrease power consumption and increase the capacity of the axial threshing and separating means when threshing long-stalked and damp crops.

INDUSTRIAL APPLICABILITY

The most effectively the present invention may be used in harvesting long-stalked, damp cereal crops such as wheat and rye, aud seed-bearing plants of grasses such as clover and lucerne etc.

The herein desclosed design of the axial threshing and separating means of the grain combine provides the high throughput capacity thereof, minimum losses of grain, decreased power consumption for the process and makes it possible to use this threshing and separating means on large productive areas.

What is claimed is:

1. An axial threshing and separating means having receiving, threshing and separating zones and comprising:
    a housing having helical guide ribs on its internal surface;
    a threshing concave and separating grate arranged in a lower part of said housing;
    a rotor mounted for rotation in said housing;
    threshing and separating elements positioned in said threshing and separating zones and mounted on a surface of said rotor and disposed thereon in steps so that each step includes conjugated helical and straight portions;

conveying elements disposed between said threshing and separating elements at an angle relative to an axis of said rotor and spaced apart with respect to each other along the length of the rotor, each said conveying element having a forward end and a rearward end;

each of said conveying elements connected by the forward end thereof to one straight portion, and the rearward end thereof is spaced from a straight portion that follows said one straight portion with respect to the direction of rotation of said rotor.

2. A means as claimed in claim 1, wherein the helical portion of one of the rotor steps is disposed partly in the threshing zone and partly in the separating zone.

3. A means as claimed in claim 1, wherein the threshing and separating elements of the rotor in the steps and therebetween adjoining each other.

4. A means as claimed in claim 1, wherein the helical portion of the rotor step starting from the forward end of the threshing zone has a section of variable height which increases in the direction of axial flow of the material.

5. A means as claimed in claim 4, wherein an outer edge of the helical portions is made in the form of a wavy curve.

* * * * *